July 3, 1945. G. C. GARRAWAY Re. 22,654

PHOTOGRAPHIC DEVELOPING MACHINE

Original Filed Feb. 2, 1942 4 Sheets-Sheet 1

Inventor

George C. Garraway

By Harold E. Stonebraker,

Attorney

July 3, 1945. G. C. GARRAWAY Re. 22,654

PHOTOGRAPHIC DEVELOPING MACHINE

Original Filed Feb. 2, 1942 4 Sheets-Sheet 2

Inventor

George C. Garraway

By Harold E. Stonebraker

Attorney

July 3, 1945. G. C. GARRAWAY Re. 22,654

PHOTOGRAPHIC DEVELOPING MACHINE

Original Filed Feb. 2, 1942 4 Sheets-Sheet 3

Inventor

George C. Garraway

By Harold E. Stonebraker

Attorney

PHOTOGRAPHIC DEVELOPING MACHINE

Original Filed Feb. 2, 1942 4 Sheets-Sheet 4

Inventor

George C. Garraway

By Harold E. Stonebraker,

Attorney

Reissued July 3, 1945

Re. 22,654

UNITED STATES PATENT OFFICE 22,654

PHOTOGRAPHIC DEVELOPING MACHINE

George C. Garraway, Rutherford, N. J.

Original No. 2,347,189, dated April 25, 1944, Serial No. 429,150, February 2, 1942. Application for reissue March 9, 1945, Serial No. 581,955

17 Claims. (Cl. 95—94)

(Granted under the act of March 3, 1883, as amended April 30, 1928; 370 O. G. 757)

The invention described herein may be manufactured and used by or for the Government for governmental purposes, without payment to me of any royalty thereon.

This invention relates to the photographic developing art, more particularly it is directed to a machine in which photographic prints or like are automatically moved through various treating fluids to perform the developing, fixing, washing and other desired operations thereon prior to drying.

One of the objects of the invention is to provide a machine for automatically developing, fixing, washing or otherwise treating before drying, such as dyeing or toning, photographic prints, film, or other material with various liquids or solutions, which material may be in a continuous strip or in separate sheets.

Another object of the invention is to provide a photographic developing machine, including a plurality of frames arranged adjacent to each other and having their lower ends immersed in a treating fluid contained in a tank, each of the frames carrying a plurality of endless belts actuated to move on the frames through the treating fluid in the tank, means for alternately guiding the material between the frames, and means including tension rollers adapted to hold the endless belts on one frame in frictional contact with the endless belt on another frame, whereby the material to be treated is alternately conveyed by the endless belts into and out of the treating fluid in the tank.

Other objects of the invention are to provide a photographic developing machine including a set of frames mounted on a tank containing a treating fluid and having drive and driven shafts rotatably mounted thereon, rollers or spools mounted on said shafts, means for alternately actuating in opposite directions said drive shafts, a plurality of endless belts passing around said rollers and adapted to alternately feed photographic prints, film, or other material into and out of the treating fluid contained in the tank for developing or otherwise treating the material, deflectors for guiding the material between the frames, to provide means for conveying the material from the set of frames in said tank to endless belts on another set of frames in another tank, said last-mentioned endless belts adapted to alternately feed the material into and out of a different solution contained in the last-mentioned tank for fixing, washing, or otherwise treating, such as dyeing or toning, the material prior to drying, whereby any treatment for any desired period of time may be given to the material.

Briefly stated, the improved developing machine comprises a plurality of endless belts passing around rollers which are in turn fixedly mounted on drive and driven shafts rotatably mounted on separate frames of a set, the frames of the set being arranged adjacent to each other, whereby the endless belts on one frame are adjacent to the endless belts on an adjacent frame, the lower end of said set of frames being immersed in a treating fluid contained in a tank, one of each of the driven shafts being rotatably mounted on the lower end of one of each of the frames, and one of each of the drive shafts being rotatably mounted on the upper end of one of each of the frames and alternately driven in opposite directions by worm gears on the drive shafts and worms mounted on a power driven shaft; means including tension rollers adapted to hold one side of the endless belts on one frame in contact with one side of the endless belts moving in the same direction on an adjacent frame, deflectors mounted on the upper ends of certain of said frames and deflectors mounted on the lower ends of certain of said other frames and adapted to alternately guide the material to be treated between the frames, whereby photographic prints, film or other material, either in a continuous strip or separate sheets, may be alternately conveyed into and out of the fluid in the tank for developing or otherwise treating the material, for any desired period of time, another set of frames, including endless belts, which last-mentioned set of frames is immersed at its lower end in a different fluid contained in another tank for fixing, washing, or otherwise treating the material; means for conveying the material from the first-mentioned set of frames to the second set of frames; and means for conveying the material from the endless belts on the second-mentioned set of frames through a wringer to a device for drying the material.

With the above and other objects and advantages in view, the invention consists of certain features of construction and operation of parts which will hereinafter appear, and in which.

Figure 1:
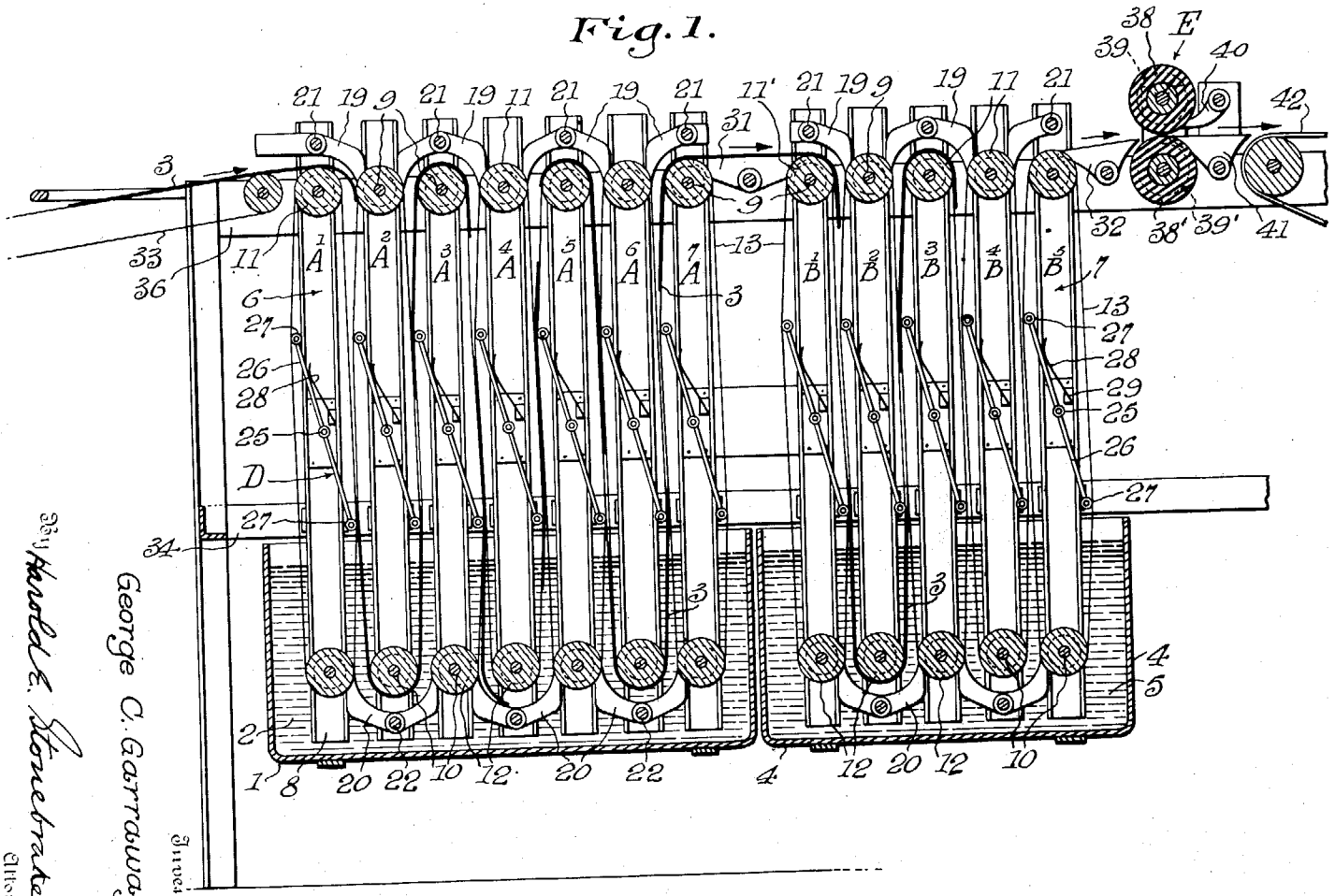
Fig. 1 is a fragmentary longitudinal sectional view through the improved photographic developing machine.

Referring more particularly to Fig. 1 of the drawings, the improved photographic developing machine comprises a tank 1 containing a suitable treating fluid 2 for developing or otherwise treating the material 3, which material may consist of photographic prints, film, or other flexible material, either in a continuous strip or in separate sheets as illustrated, and 4 is another tank containing a different treating fluid 5 which may be used for fixing, washing, or otherwise treating such as dyeing or toning the material to be treated. It will be understood that any suitable number of tanks containing various liquids or solutions for carrying out the invention may be employed.

Cooperating with the tank 1 is a set 6 of vertically extending interchangeable frame members $A^1$ to $A^7$, inclusive, and cooperating with the tank 4 is another set 7 of interchangeable frame members $B^1$ to $B^5$ inclusive, which frame members of each set are arranged in spaced formation adjacent to each other, with their lower ends projecting into the tanks and immersed in the treating fluids. Each of the frame members of both sets 6 and 7 are individually removably mounted in the tanks 1 and 4, respectively, and comprises a pair of vertically extending side bars 8 having a horizontally extending drive shaft 9 rotatably mounted on their upper ends above the tanks and a horizontally extending driven shaft 10 rotatably mounted on the lower ends of the side bars 8 within the tanks parallel with the drive shaft 9.

The side bars 8 of the frame members are slidably mounted in guide ways 8' which are provided on angle plates 34 mounted on the upper end and on opposite sides of the fluid treatment tanks 1 and 4.

Figure 2:
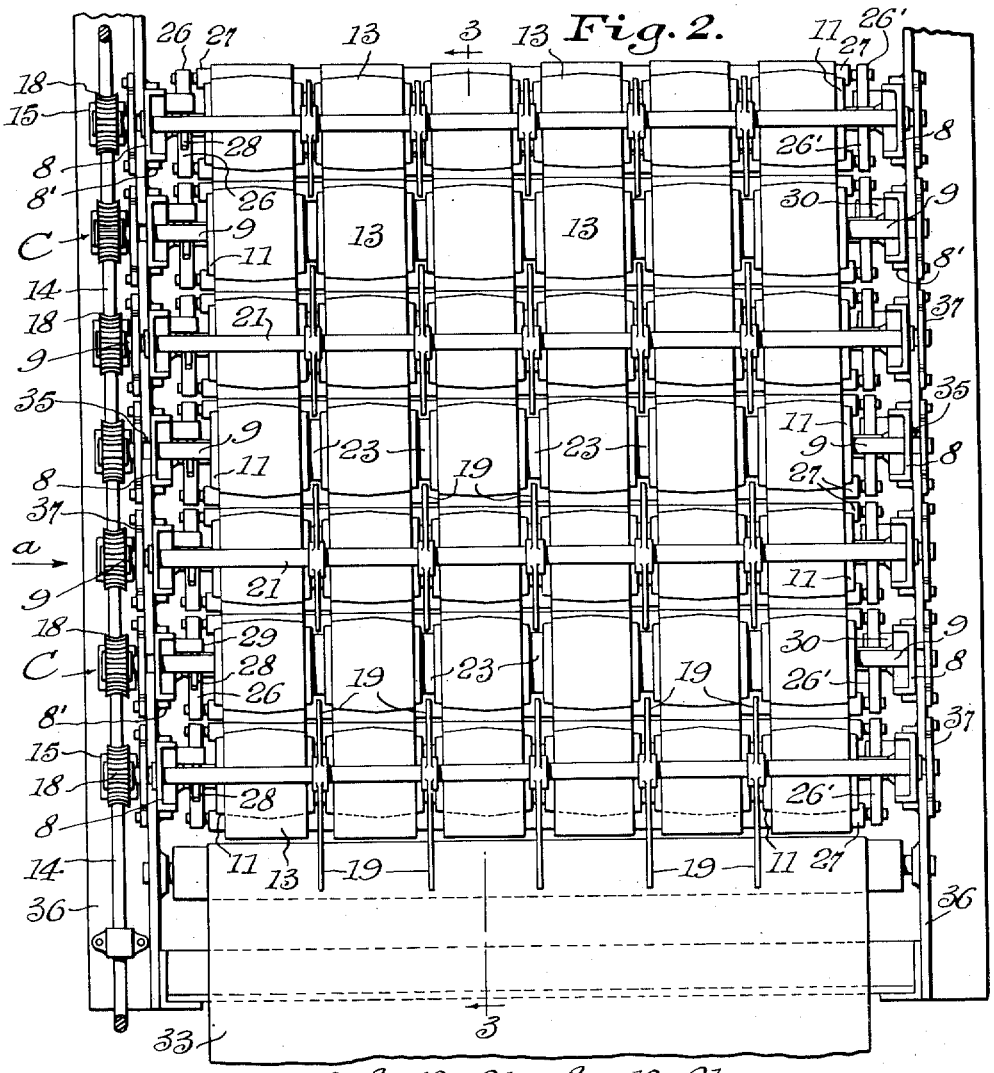
Fig. 2 is an enlarged fragmentary top plan view of a portion of the machine illustrated in Fig. 1.
Figure 3:
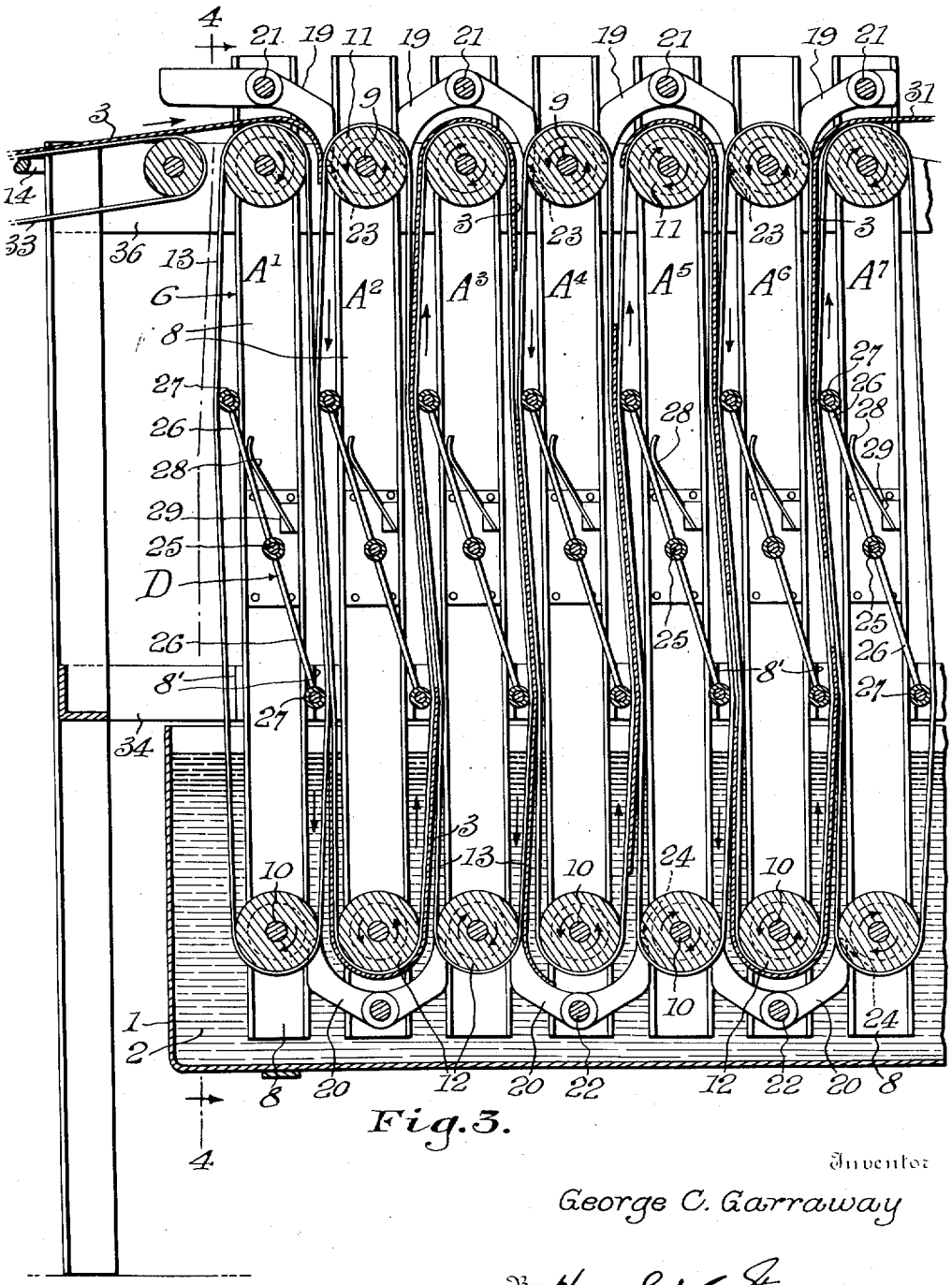
Fig. 3 is a fragmentary longitudinal sectional view taken on the line 3—3 of Fig. 2.
Figure 4:
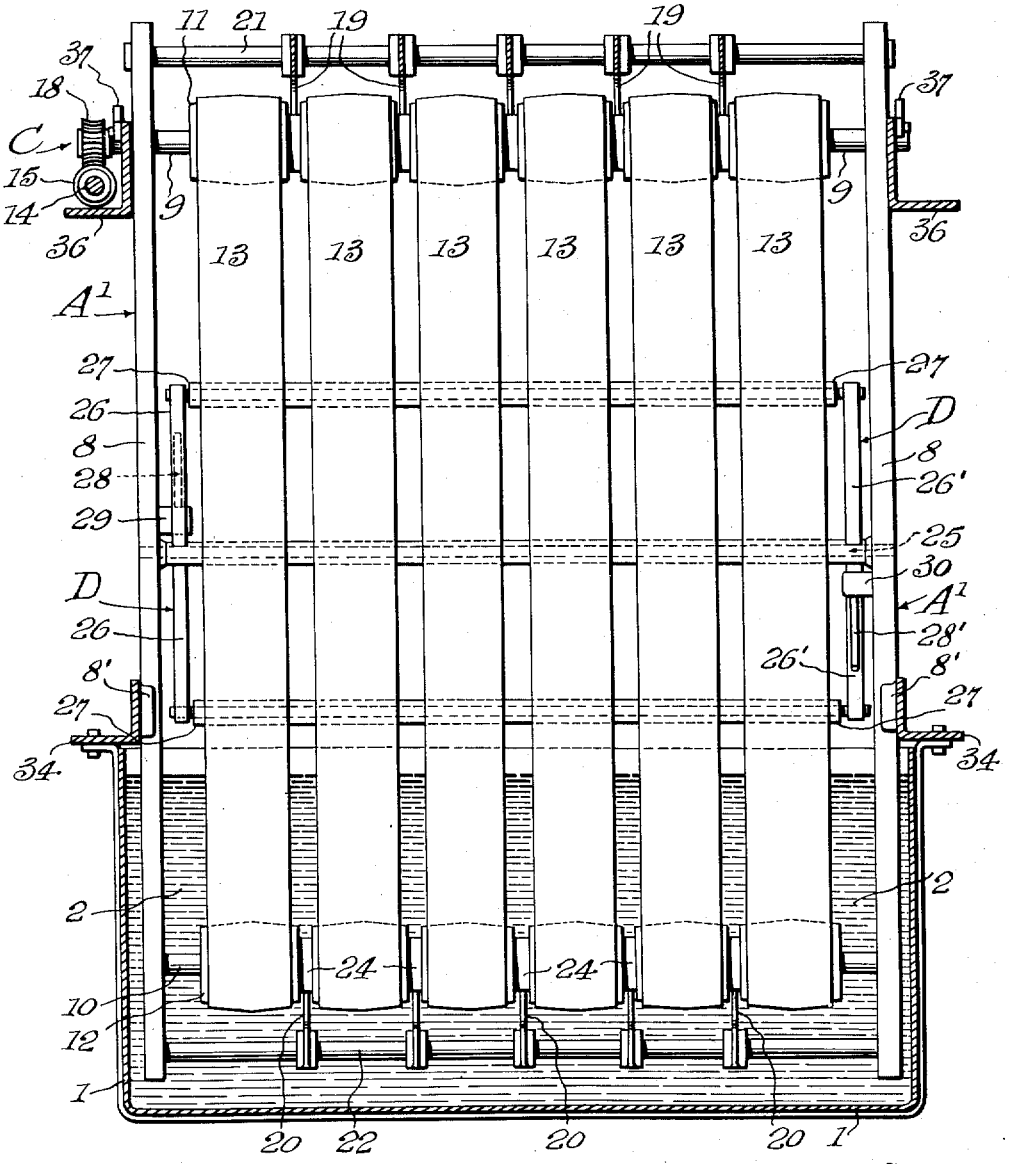
Fig. 4 is a vertical sectional view taken on the line 4—4 of Fig. 3.

The drive and driven shafts 9 and 10, respectively, of each frame member have rollers or spools 11 and 12, respectively, fixedly mounted thereon, which rollers 11 and 12 carry a plurality of endless belts 13, preferably made of a porous material, such as glass fiber or woven wire cloth. The side portions of the endless belts 13 between the rollers 11 and 12 on the shafts 9 and 10 extend vertically upward with one side portion of the endless belts on one frame member being adjacent to one side portion of the endless belts on another frame member of a set. The drive shafts 9 on the sets 6 and 7 of frame members extend through the side bars 8 of the frame members and seat in slots 35 formed in angle plates 36 where they are removably held in operative position by keepers 37 or other suitable devices. The drive shafts 9 are alternately driven in opposite directions by a drive mechanism indicated generally by C in Figs. 2, 4 and 5, and the drive shafts 9 on the set 7 of frame members are driven in the same opposite directions as the drive shafts 9 of the set 6 of frame members, thus rotating the rollers or spools 11 on the drive shafts 9 on the set 6 of frame members in alternate directions as indicated by the arrows in Figs. 3 and 5 and the rollers or spools 11 and 11' on the drive shafts 9 of the set 7 of frame members, with the rollers or spools 11' on the frame member $B^1$ of the set 7 of frame members rotating in the same direction as the rollers or spools 11 adjacent thereto on the drive shaft 9 of the frame member $A^7$ of the set 6 of frame members, and causing the endless belts 13 to move in the directions as indicated by the arrows, which in turn rotate the driven shafts 10 on the lower end of the frame members and hence the rollers or spools 12 thereon in the direction as indicated by the arrows in Fig. 3.

Figure 5:
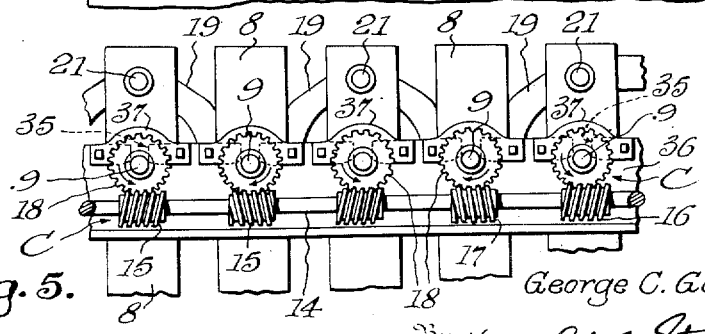
Fig. 5 is a fragmentary side elevation of a portion of the machine looking in the direction of the arrow *a* in Fig. 2 and showing a portion of a mechanism for alternately driving in opposite directions a plurality of shafts mounted on frames used in carrying out the invention.

The drive mechanism C comprises a shaft 14 driven by any suitable source of power (not shown) and having a plurality of worms 15 arranged in spaced formation thereon with each alternate worm on the shaft 14 having left and right-hand threads 16 and 17, respectively, as illustrated in Fig. 5. The worms 15 mesh with worm gears 18, one of each of which is mounted on one end of one each of the drive shafts 9 on the upper ends of the frame members for alternately rotating the drive shafts 9 in opposite directions. By alternately rotating the drive shafts 9 on the set 6 of frame members in opposite directions, and hence the rollers or spools mounted thereon, in the same direction, a portion at the right of the endless belt 13 on the frame member $A^1$ is caused to travel downwardly and the outer portion at the left of the endless belt 13 on the frame member $A^2$ adjacent thereto is caused to move downwardly in the same direction as indicated by the arrows and the portion at the right of the endless belt on the frame member $A^2$ and the portion at the left of the endless belt on the frame member $A^3$ are caused to move upwardly. The movement of the endless belts on the other frame members $A^4$ to $A^7$ inclusive of the set 6 of frame members is repeated in the same manner as the endless belts on the frame members $A^1$ to $A^3$.

In order to guide the photographic prints or other material 3 between the frame members, a plurality of deflectors 19 in the form of curved plates are provided on the upper end of certain of the frame members and a plurality of deflectors 20 are provided on the lower end of certain of the other frame members adjacent thereto, in an alternate manner, beginning with the frame member $A^1$ of the set 6 of frame members on the tank 1 and the frame member $B^1$ of the set 7 of frame members on tank 4. The deflectors 19 and 20 are mounted in spaced formation on horizontally extending rods 21 and 22, respectively, provided on the upper and lower ends of the side bars 8 of the frame members and the deflectors 19 and 20 extend at right angles to the spools 11 and 12 on the drive and driven shafts 9 and 10, respectively. One of the ends of the deflectors 19 on the upper end of the frame member $A^1$ engages in a series of circumferential grooves 23 formed in the peripheral surface of the roller or spool 11 on the drive shaft 9 on the upper end of the frame member $A^2$, and one end of the deflectors 20 on the lower end of the frame member $A^2$ engages in a series of grooves 24 formed in the peripheral surface of the roller or spool 12 on the lower end of frame member $A^1$, and another end of the deflectors 20 on the lower end of the frame member $A^2$ engages in the series of circumferential grooves 24 in the roller or spool 12 on the lower end of the frame member $A^3$. One end of deflectors 19 on the upper end of the frame member $A^3$ engages in the circumferential grooves 23 in the roller or spool 11 on the upper end of the frame member $A^2$, with another end of the deflectors 19 on the frame member $A^3$ engaging in the grooves 23 in the roller or spool 11 on the upper end of the frame member $A^4$. The deflectors on the set 6 of frame members are thus alternately arranged in staggered relation throughout the set and the deflectors on the set 7 of frame members are alternately arranged in the same staggered relation as the deflectors on the set 6 of frame members, with the edges of the deflectors being at a tangent to the surfaces of the rollers or spools. The grooves in each roller or spool are in spaced relation with respect to each other across the peripheral face of the roller or spool with the rollers or spools on the drive and driven shafts 9 and 10, respectively, being so arranged that the grooves in the rollers are in substantial alinement with each other longitudinally of the rollers.

In order to cause a surface of an endless belt 13 on one frame member to contact with a surface of the endless belt on another frame member adjacent thereto for causing the endless belts to carry the material to be treated through the treating fluid in the tanks, a separate frame indicated generally by D is provided on each of the frame members of the sets 6 and 7. Each of the separate frames D comprises a central supporting shaft 25 which is rotatably mounted at its ends on the side bars 8 of the frame members and has connecting rods 26 and 26′ provided thereon which carry longitudinally extending tension rollers 27 on their outer ends. The separate frame D on each frame member is actuated in a counter-clockwise direction by means of springs 28 and 28′ under tension, with one end of one spring 28 being mounted at 29 on one of the side bars 8 of a frame member, and with the other end thereof bearing against the connecting rod 26 on one side of the separate frame D and with one end of the spring 28′ connected at 30 to a side bar 8 on the other side of the frame member, with the other end of the spring 28′ bearing against connecting rod 26′ on the other side of the separate frame and extending in an opposite direction from the spring 28, whereby the tension rollers 27 on the separate frames D are caused to press outwardly against opposite sides of the plurality of endless belts 13, causing certain portions of the belts on one frame member to frictionally contact with the endless belts on another frame member for feeding the photographic prints or other material 3 into and out of the different treating fluids contained in the tanks 1 and 4.

The photographic prints or other material 3 is transferred from the last endless belt on the frame member $A^7$ of set 6 to the first endless belt on the frame member $B^1$ of set 7 by means of any suitable type of bridge member 31, and from the last endless belt on the frame member $B^5$ of the set 7 by another bridge member 32 to a wringer indicated generally by E comprising rubber covered rollers 38 and 38′ revolvably mounted in contact with each other and having circumferential knife cuts 39 and 39′, respectively, provided therein in which one end, tapered to a thin edge, of blades 40 and 41, respectively, are adapted to ride. The cuts 39 in the rollers 38 may be out of alignment with the cuts 39′ in the rollers 38′ and are closed by the rubber adjacent to the cuts except at the points of connection where the ends of the blades 40 and 41 engage the rollers. The blades 40 and 41 separate the treated material from the rollers 38 and 38′ and the blades 41 provide a bridge member between the wringer E and a belt 42 which is adapted to convey the material to any suitable type of dryer (not shown).

In operation, the photographic prints or other material 3 to be treated is conveyed to the roller or spool 11 on the upper end of the frame member $A^1$ by a conveyor belt 33 and is guided between the frame members $A^1$ and $A^2$ by the deflectors 19 on the upper end of the frame member $A^1$ with only the narrow edge of the deflectors coming in contact with the photographic prints, thereby eliminating the tendency of the photographic prints to buckle. The material 3 is then caused to extend between the endless belts on the frame members $A^1$ and $A^2$, and then carried by one side of the endless belts 13 moving downwardly, as indicated by the arrow, on the frame members $A^1$ and $A^2$ and through the treating fluid 2 in the tank 1 where it is guided by the deflectors 20 on the lower end of the frame member $A^2$ between the frame members $A^2$ and $A^3$, where the other side of endless belts on the frame member $A^2$ moving upwardly in the direction as indicated by the arrow, and one side of the endless belts on the frame member $A^3$ in contact therewith also moving upwardly, carries the material 3 upwardly where it is guided by the deflector 19 on the upper end of the frame member $A^3$ to between the frame members $A^3$ and $A^4$ and carried by the endless belts on the frame members $A^3$ and $A^4$ downwardly and so on by the other endless belts on the other frame members through the set 6 of frame members. The material 3 is then caused to pass across the bridge member 31 to the set 7 of frame members, where it is guided by the deflector 19 on the upper end of the frame member $B^1$ to between the frame members $B^1$ and $B^2$ and carried by the endless belts 13 on the frame members $B^1$ and $B^2$ through another treating fluid 5 in the tank 4, and then guided by the deflector 20 on the lower end of the frame member $B^2$ to between the frame members $B^2$ and $B^3$, and is then conveyed through the set 7 of frame members to the upper end of the frame member $B^5$ where it is caused to cross the bridge member 32 and to pass between the rollers 38 and 38′ of the wringer E which removes any surplus fluid from the treated material 3. The blades 40 and 41 then separate the material from the rollers 38 and 38′ and then the material passes across the blades 41 which provide a bridge member between the wringer E and the belt 42 which conveys the material to a dryer (not shown).

Should the endless belts on the frame members become broken or it is necessary to clean them, the keepers 37 are adjusted to permit the drive shafts 9 on the upper ends of the frame members to be removed from the slots 35 on the angle plates 36 and the frame members may be individually removed by pulling vertically upward thereon thus removing them from the guideways 8′ on the angle plates 34.

It will thus be seen that there is herein provided a novel and useful form of photographic developing machine which is well adapted for all the purposes intended. Even though there has been herein shown and described certain features of construction and operation of parts, it is nevertheless to be understood that various changes may be made therein if the changes do not depart from the spirit or scope of the claims.

Having described my invention, what I claim as new and wish to secure by Letters Patent is:

1. A photographic developing machine comprising, in combination, a tank adapted to contain a treating fluid, a plurality of interchangeable frame members individually removably mounted in said tank, means including a plurality of endless belts mounted on said frame members and adapted to convey alternately material to be treated into and out of the treating fluid in said tank, and automatically adjustable holding means adapted to take up slack in said endless belts and retain them in frictional contact with each other without interfering with their separation and removal from the tank with said frame members.

2. A photographic developing machine comprising, in combination, a plurality of tanks adapted to contain treating fluids, a plurality of interchangeable frame members individually removably mounted in each of said tanks, means including endless belts and guide members mounted on each of said frame members, spring-pressed holding means for taking up looseness of said belts and for holding them in frictional contact with each other, said first-mentioned means adapted to convey alternately the material to be treated into and out of the treating fluid in a tank, and means intermediate the tanks for delivering the material from one tank to the frame members in another tank, said spring-pressed holding means adapted to permit said belts to be separated from one another and removed from the tanks with said frame members.

3. A photographic developing machine comprising, in combination, a plurality of tanks adapted to contain treating fluids, a plurality of interchangeable frame members individually removably mounted in each of said tanks, a drive shaft and a driven shaft rotatably mounted on each of said frame members, a plurality of endless belts mounted in spaced relation on said drive and driven shafts of each of said frame members, means adapted to rotate alternately said drive shafts in opposite directions for moving alternately said endless belts in opposite directions whereby said driven shafts are alternately rotated by said endless belts in the same opposite directions as the drive shafts, automatically adjustable holding means for taking up slack of said endless belts and for holding the endless belts on one frame member in frictional contact with the endless belts on another frame member for conveying a material to be treated, guide members mounted on said frame members and arranged in a manner that the endless belts may alternately convey the material to be treated into and out of the treating fluid in a tank, and means intermediate the tanks for delivering the material from one tank to the frame members in another tank, said automatically adjustable holding means adapted to permit the belts on one frame member to be separated from the belts on another frame member and removed from the tanks with said frame members.

4. A photographic developing machine comprising, in combination, a plurality of tanks adapted to contain treating fluids, a plurality of interchangeable frame members individually removably mounted on each of said tanks, a drive shaft and a driven shaft rotatably mounted on each of said frame members, supporting means mounted on said drive and driven shafts, endless belts mounted on said supporting means, means for rotating said drive shafts for rotating said supporting means thereon, said endless belts adapted to be rotated by said supporting means and adapted to rotate said driven shafts, spring-pressed holding means for taking up looseness of said endless belts and for holding the endless belts on one frame member in frictional contact with the endless belts on another frame member for conveying a material to be treated, grooves provided in said supporting means, guide members mounted on said frame members and extending into said grooves, said guide members alternately arranged on said frame members whereby said endless belts may alternately convey a material to be treated into and out of the treating fluid in a tank, and means intermediate the tanks for delivering the material from one tank to the frame members in another tank, said spring-pressed holding means adapted to permit the belts on one frame member to be separated from the endless belts on another frame member and removed from the tanks with said frame members.

5. A photographic developing machine comprising, in combination, a plurality of tanks adapted to contain treating fluids, a plurality of interchangeable frame members individually removably mounted in each of said tanks, a drive shaft and a driven shaft rotatably mounted on each of said frame members, a roller fixedly mounted on each of said drive and driven shafts, a plurality of endless belts mounted at their opposite ends respectively on the rollers on said drive shafts and the rollers on said driven shafts, means for rotating said drive shafts for moving said endless belts on the frame members whereby said driven shafts are rotated by said endless belts, automatically adjustable holding means mounted on said frame members for taking up slack of said endless belts on a frame member and for holding said endless belts on one frame member in frictional contact with the endless belts on another frame member whereby the endless belts are adapted to convey a material to be treated, circumferential grooves formed in said rollers on the drive and driven shafts, guide members mounted on said frame members, said guide members engaging said grooves and alternately arranged in a manner that the endless belts may alternately convey the material to be treated into and out of the treating fluid in a tank, and means intermediate the tanks for delivering the material from the frame members in one tank to the frame members in another tank, said automatically adjustable holding means adapted to permit the belts on one frame member to be separated from the belts on another frame member and removed from the tanks with said frame members.

6. A photographic developing machine comprising, in combination, a plurality of tanks adapted to contain treating fluids, a plurality of interchangeable frame members individually removably mounted in each of said tanks, a drive shaft and a driven shaft rotatably mounted on each of said frame members, a roller fixedly mounted on each of said drive and driven shafts, a plurality of endless belts carried by said rollers on the drive and driven shafts, means adapted to rotate alternately the drive shafts in opposite directions whereby said driven shafts are alternately rotated in opposite directions by said endless belts, spring-pressed frames including rollers mounted on said frame members for taking up looseness of said endless belts and for holding the endless belts on one frame member in frictional contact with the endless belts on another frame member whereby said endless belts on said frame members are adapted to convey a material to be treated, circumferential grooves formed in said rollers on the drive and driven shafts, deflectors mounted on said frame members, said deflectors extending into said circumferential grooves and alternately arranged in a manner that the endless belts may alternately convey the material to be treated into and out of the treating fluid in a tank, and means intermediate the tanks for delivering the material from the frame members in one tank to the frame members in another tank, said spring-pressed frames adapted to permit the belts on one frame member to be separated from the belts on another frame member and removed from the tanks with said frame members.

7. A photographic developing machine comprising, in combination, a plurality of tanks adapted to contain treating fluids, a plurality of interchangeable frame members individually removably mounted in each of said tanks, an upper drive shaft and a lower driven shaft rotatably mounted on each of said frame members, said drive and driven shafts disposed in parallel relation, a roller fixedly mounted on each of said drive and driven shafts, said roller on said drive shaft being disposed directly above the roller on said driven shaft, a plurality of endless belts engaging said rollers on said drive and driven shafts of each of said frame members, means for alternately rotating said drive shafts in opposite directions for moving said endless belts on said frame members, said drive shafts being alternately rotated in the same opposite directions as said driven shafts by said endless belts, automatically adjustable holding means mounted on said frame members for taking up slack of the endless belts and for holding the endless belts on one frame member in frictional contact with the endless belts on another frame member whereby the endless belts on said frame members are adapted to convey a material to be treated, circumferential grooves formed in said rollers on the drive and driven shafts, deflectors mounted in said frame members, said deflectors engaging said grooves and alternately arranged on said frame members in a manner that said endless belts may alternately convey the material to be treated into and out of the treating fluid in a tank, and means intermediate the tanks for delivering the material from the frame members in one tank to the frame members in another tank, said automatically adjustable holding means adapted to permit the belts on one frame member to be separated from the belts on another frame mmeber and removed from the tanks with said frame members.

8. A photographic developing machine comprising, in combination, a plurality of tanks adapted to contain treating fluids, a plurality of interchangeable frame members individually, removably mounted in each of said tanks, rollers mounted to be rotated on said frame members, grooves formed in said rollers, a plurality of vertically extending endless belts carried by said rollers on each of said frame members, means for rotating certain of said rollers for moving said endless belts on said frame members, spring-pressed holding means mounted on each of said frame members for taking up looseness of said endless belts and for holding said endless belts on one frame member in frictional contact with the endless belts on another frame member whereby the endless belts on said frame members may convey a material to be treated, deflectors engaging in each of said grooves and alternately arranged on said frame members in a manner that said endless belts may alternately convey the material to be treated into and out of the treating fluid in a tank, and means intermediate said tanks for delivering the material from the frame members in one tank to the frame members in another tank, said spring-pressed holding means adapted to permit the endless belts on one frame member to be separated from the endless belts on another frame member and removed from the tanks with said frame members.

9. A photographic developing machine comprising, in combination, a plurality of tanks adapted to contain treating fluids, a plurality of interchangeable frame members individually removably mounted adjacent to each other in each of said tanks, each of said frame members including a pair of parallelly arranged side bars, a horizontally extending drive shaft rotatably mounted on and adjacent to the upper ends of each pair of said side bars, and a horizontally extending driven shaft rotatably mounted on and adjacent to the lower ends of each pair of side bars, a roller fixedly mounted on each of said drive and driven shafts, said rollers disposed longitudinally of said drive and driven shafts, with the rollers on said drive shafts being disposed directly above the rollers on said driven shafts, a plurality of endless belts mounted at their opposite ends respectively on the rollers on the drive shafts and the rollers on the driven shafts, means adapted to alternately rotate said drive shafts in opposite directions whereby said endless belts on one frame member are driven in the opposite direction from the endless belts on an adjacent frame member thus alternately rotating the driven shafts in opposite directions, automatically adjustable holding means for taking up slack of said endless belts and for holding the endless belts on one frame member in frictional contact with the endless belts on another frame member whereby the endless belts on said frame members may convey material to be treated, transversely extending circumferential grooves formed in said rollers on said drive and driven shafts, deflectors mounted on said frame members and extending into said grooves, said deflectors alternately arranged on the frame members in a manner that said endless belts may alternately convey the material to be treated into and out of a tank, and means intermediate the tanks for delivering the material from the frame members in one tank to the frame members in another tank, said automatically adjustable holding means adapted to permit the endless belts on one frame member to be separated from the endless belts on another frame member and removed from the tanks with said frame members.

10. A photographic developing machine comprising, in combination, a tank adapted to contain a treating fluid, a plurality of frame members individually removably mounted adjacent to each other in said tank, a plurality of endless belts mounted on each of said frame members, said endless belts on a frame member separated from the endless belts on an adjacent frame member, and automatically adjustable holding means adapted to move said separated endless belts on said frame members into frictional contact with each other whereby said endless belts may convey a material to be treated through the treating fluid in said tank, said automatically adjustable means adapted to permit the endless belts to be separated and removed from the tank with said frame members.

11. A photographic developing machine comprising, in combination, a tank adapted to contain a treating fluid, a plurality of at least five frame members individually removably mounted adjacent to each other in said tank, a plurality of endless belts mounted on each of said frame members and engageable with the body of paper sheets of various sizes, rollers of the same diameter at the top and bottom of each of said frame members supporting said belts, portions of the vertical laps of the belts on each frame member engaging portions of the adjacent vertical laps of belts on adjacent frame members and acting therewith to feed a sheet into and out of the tank, and means for driving the belts on adjacent frame members in opposite directions.

12. A photographic developing machine comprising, in combination, a tank adapted to contain a treating fluid, a plurality of frame members individually removably mounted adjacent to each other in said tank, a plurality of endless belts mounted on each of said frame members and engageable with the body of paper sheets of various sizes, rollers of the same diameter at the top and bottom of each of said frame members supporting said belts, the belts on a frame member being spaced from the belts on adjacent frame members, means for driving the belts on adjacent frame members in opposite directions, and belt-engaging means acting to hold portions of adjacent vertical laps of belts on adjacent frame members in engagement with each other.

13. A photographic developing machine comprising, in combination, a tank adapted to contain a treating fluid, a plurality of frame members individually removably mounted adjacent to each other in said tank, a drive shaft and a driven shaft rotatably mounted on each of said frame members, supporting rollers of the same diameter mounted on said drive and driven shafts at the top and bottom of each of said frame members, a plurality of endless belts mounted on said supporting rollers of each frame member and spaced from each other, said belts being engageable with the body of paper sheets of various sizes, means for rotating said drive shafts on adjacent frame members in opposite directions, said endless belts being moved by the supporting rollers on the drive shafts and acting to rotate the driven shafts, portions of the vertical laps of the belts on one frame member engaging portions of the adjacent vertical laps of belts on adjacent frame members and acting therewith to feed a sheet into and out of the tank, said supporting rollers having annular grooves between the belts, and guide members on the frame members extending into the grooves of rollers on adjacent frame members, said guide members alternately arranged at the tops and bottoms of the frame members whereby the belts act to convey a sheet alternately into and out of the treating fluid in the tank.

14. A photographic developing machine comprising, in combination, a tank adapted to contain a treating fluid, a plurality of frame members individually removably mounted adjacent to each other in said tank, a drive shaft and a driven shaft rotatably mounted on each of said frame members, supporting rollers of the same diameter mounted on said drive and driven shafts at the top and bottom of each of said frame members, a plurality of endless belts mounted on said supporting rollers of each frame member and spaced from each other, said belts being engageable with the body of paper sheets of various sizes, means for rotating said drive shafts on adjacent frame members in opposite directions, said belts being moved by the supporting rollers on the drive shafts and acting to rotate the driven shafts, portions of the vertical laps of the belts on one frame member engaging portions of the adjacent vertical laps of belts on adjacent frame members and acting therewith to feed a sheet into and out of the tank, said supporting rollers having annular grooves between the belts, guide members on the frame members extending into the grooves of rollers on adjacent frame members, said guide members alternately arranged at the tops and bottoms of the frame members whereby the belts act to convey a sheet alternately into and out of the treating fluid in the tank, the belts on a frame member being spaced from the belts on adjacent frame members, and belt-engaging means acting to hold portions of adjacent vertical laps of belts on adjacent frame members in engagement with each other.

15. A photographic developing machine comprising, in combination, a tank adapted to contain a treating fluid, a plurality of at least five frame members individually removably mounted adjacent to each other in said tank, an endless belt on each of said frame members formed of porous glass fiber and engageable with the body of paper sheets of various sizes, rollers of the same diameter at the top and bottom of each of said frame members supporting said belt, portions of the vertical laps of the belt on each frame member engaging portions of the adjacent vertical laps of belts on adjacent frame members and acting therewith to feed a sheet into and out of the tank, and means for driving the belts on adjacent frame members in opposite directions.

16. A photographic developing machine comprising, in combination, a tank adapted to contain a treating fluid, a plurality of frame members individually removably mounted adjacent to each other in said tank, a plurality of endless belts mounted on each of said frame members formed of porous glass fiber and engageable with the body of paper sheets of various sizes, rollers of the same diameter at the top and bottom of each of said frame members supporting said belts, the belts on a frame member being spaced from the belts on adjacent frame members, means for driving the belts on adjacent frame members in opposite directions, and belt-engaging means acting to hold portions of adjacent vertical laps of belts on adjacent frame members in engagement with each other.

17. A photographic developing machine comprising, in combination, a tank adapted to contain a treating fluid, a plurality of frame members individually removably mounted adjacent to each other in said tank, a drive shaft and a driven shaft rotatably mounted on each of said frame members, supporting rollers of the same diameter mounted on said drive and driven shafts at the top and bottom of each of said frame members, a plurality of endless belts mounted on said supporting rollers of each frame member formed of porous glass fiber, said belts being spaced from each other and engageable with the body of paper sheets of various sizes, means for rotating said drive shafts on adjacent frame members in opposite directions, said belts being moved by the supporting rollers on the drive shafts and acting to rotate the driven shafts, portions of the vertical laps of the belts on one frame member engaging portions of the adjacent vertical laps of belts on adjacent frame members and acting therewith to feed a sheet into and out of the tank, said supporting rollers having annular grooves between the belts, guide members on the frame members extending into the grooves of rollers on adjacent frame members, said guide members alternately arranged at the tops and bottoms of the frame members whereby the belts act to convey a sheet alternately into and out of the treating fluid in the tank, the belts on a frame member being spaced from the belts on adjacent frame members, and belt-engaging means acting to hold portions of adjacent vertical laps of belts on adjacent frame members in engagement with each other.

GEORGE C. GARRAWAY.